Sept. 11, 1928.                                              1,684,099
                        F. W. JURY
                    GEAR CUTTING MACHINE
                    Filed June 1, 1926            6 Sheets-Sheet 1

Inventor
F. W. Jury

Sept. 11, 1928.

F. W. JURY

GEAR CUTTING MACHINE

Filed June 1, 1926

Sept. 11, 1928.                    F. W. JURY                    1,684,099
                              GEAR CUTTING MACHINE
                              Filed June 1, 1926            6 Sheets-Sheet 6

Patented Sept. 11, 1928.

1,684,099

UNITED STATES PATENT OFFICE.

FRANK W. JURY, OF MILWAUKEE, WISCONSIN, ASSIGNOR TO THE FALK CORPORATION, OF MILWAUKEE, WISCONSIN, A CORPORATION OF WISCONSIN.

GEAR-CUTTING MACHINE.

Application filed June 1, 1926. Serial No. 112,979.

This invention relates to gear cutting machines.

Objects of this invention are to provide a gear cutting machine adapted to cut double helical gears.

Further objects of this invention are to provide a machine for cutting double helical gears in a manner to avoid the central gap which usually appears at the union of the two divergent teeth.

In general, this invention is an improvement over that disclosed in my prior Patent #1,456,240 of May 22, 1923, for gear cutting machines, and has the same general objects as those disclosed in such patent.

Further objects are to provide a novel form of gear cutting machine in which the slides for carrying the cutters are independently operated by a pair of independent cranks, which are connected in a positive manner, and to provide a novel form of advancing means which is so constructed that the major portion of it runs continuously in a uniform manner without starting and stopping, and in which means are provided for combining the advancing or indexing motion of the work with the normal advance of the cutter so that the work and the cutters move in the proper relative manner to secure a proper development of the teeth.

Further objects are to provide a gear cutting machine in which a high speed may be obtained, in which no over running of the feeding mechanism can occur, in which there is no back lash, and in which the angles of the teeth, of the cutters, and of the cutter guides are uniform throughout.

Further objects are to provide a gear cutting machine in which the work is stationary while the cutting takes place, in which the construction is such that a very rugged and simple machine results, and which is practical to operate for the production of small or large gears in an economical manner.

In general, the machine consists of two independent cranks which are continuously driven from a source of power and independently operate the cutters, such cutters being set approximately 90° apart and guided in independent angular guides. These cutters operate upon work which is driven or indexed in a step by step manner, and in which additional movement is given to the work to correspond to the gradual upward feed of the cutter guides.

An embodiment of the invention is shown in the accompanying drawings in which:—

Figures 8, 9, 10, 11 are diagrammatic face views showing the position of the cutter blocks at successive stages in the cycle of operation.

Figures 8$^a$, 9$^a$, 10$^a$ and 11$^a$ are corresponding views showing the position of the cutters at the instants corresponding to those indicated in Figures 8 to 11 inclusive;

Figure 1:
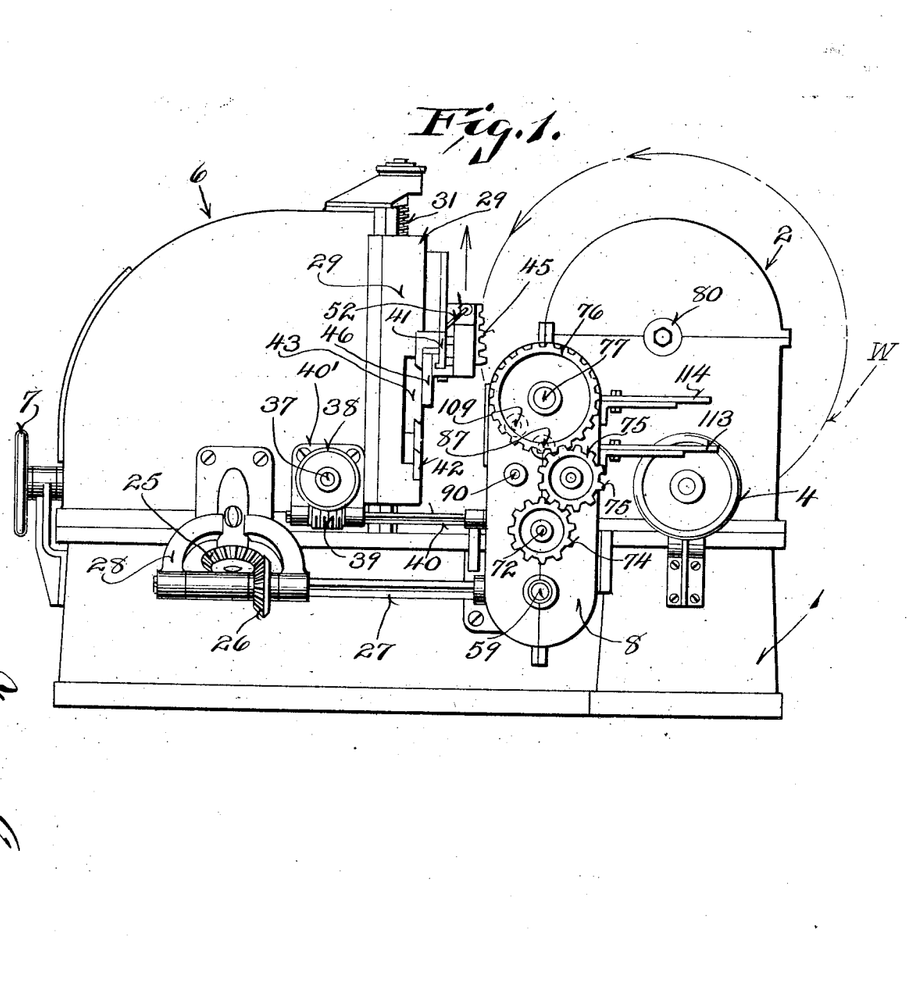
Figure 1 is an end view of the gear cutting machine showing in imaginary lines the outline of the blank or work.
Figure 2:
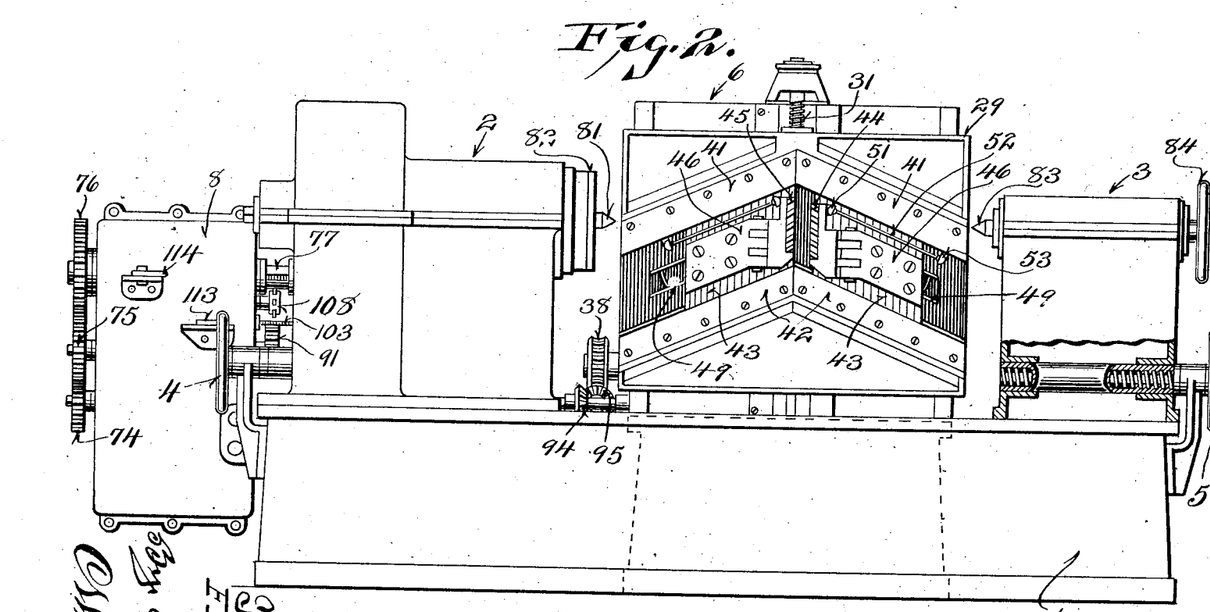
Figure 2 is a front view of the machine.

Referring to the drawings it will be seen that the machine comprises a bed 1 which carries a main head 2 and an auxiliary head or tail stock 3, as most clearly brought out in Figure 2. These members are moved along guides formed in the bed in any suitable manner, as by means of the hand wheels 4 and 5 for driving the screw threaded shafts, as indicated at the right hand side of Figure 2, so as to advance the heads or retract them for the proper positioning of the mandrel which carries the work or blank. The bed also carries a cutter head, indicated generally by the reference character 6, and shown most clearly in Figures 1, 2, and 3. This cutter head is also mounted on guides at right angles to those previously mentioned and is advanced or retracted by means of the hand wheel 7 or in any other suitable manner. In addition to these main portions the bed carries a fourth main unit, namely, the gear box 8 which is preferably mounted to the side of the bed, as indicated particularly in Figures 1, 2, and 3.

The work or blank "W" rotates in the direction indicated by the arrows in Figure 1, and the cutters, in addition to their reciprocatory motion, travel upwardly, as indicated by the arrow in Figure 1.

The general mode of operation of the machine is as follows:

The work or blank is rotated in a step by step manner, and the cutters reciprocate in and out on slanting lines corresponding to the angles of the double helical teeth. The work is held stationary during each stroke of the cutters and each cutter comes to the center line and is withdrawn from the work and travels back to its initial position. The cutters are operated by cranks set approximately 90° apart, and are both simultaneously out of the work for approximately one-quarter of a revolution of the cranks. During this period the work is indexed and the cutters execute cuts thereafter during the next cycle forming the next teeth.

These teeth are not formed completely on any portion of the work, but are partially formed complete around the blank, and as the cutters are tapered and are fed upwardly, the depth of cut and, consequently, the shaping of the tooth progresses steadily until the entire tooth outline is formed complete around the work. It is to be noted that the indexing of the blank insures the correct generation of the tooth outline as the cutters are also moved slowly upwardly. When the cutters have traveled through their complete upward stroke, the teeth are complete entirely around the blank. In this way the proper generation of teeth is secured and also unequalled expansion or change in the internal structure of the blank is avoided for the initial or inherent stresses in the blank are not relieved at any one point, but are gradually relieved by the small cuts completely around the entire blank. Consequently, the finished gear is absolutely true with reference to its axis.

By having the work rotate in one direction in a step by step manner and by having the cutters travel in the opposite direction, it is clear that back lashing of the gear train is always taken up and, consequently, no error can occur in the finished gear.

It is, of course, to be understood that the direction of rotation and also the direction of travel of the cutters may be reversed without departing from this invention.

Figure 3:
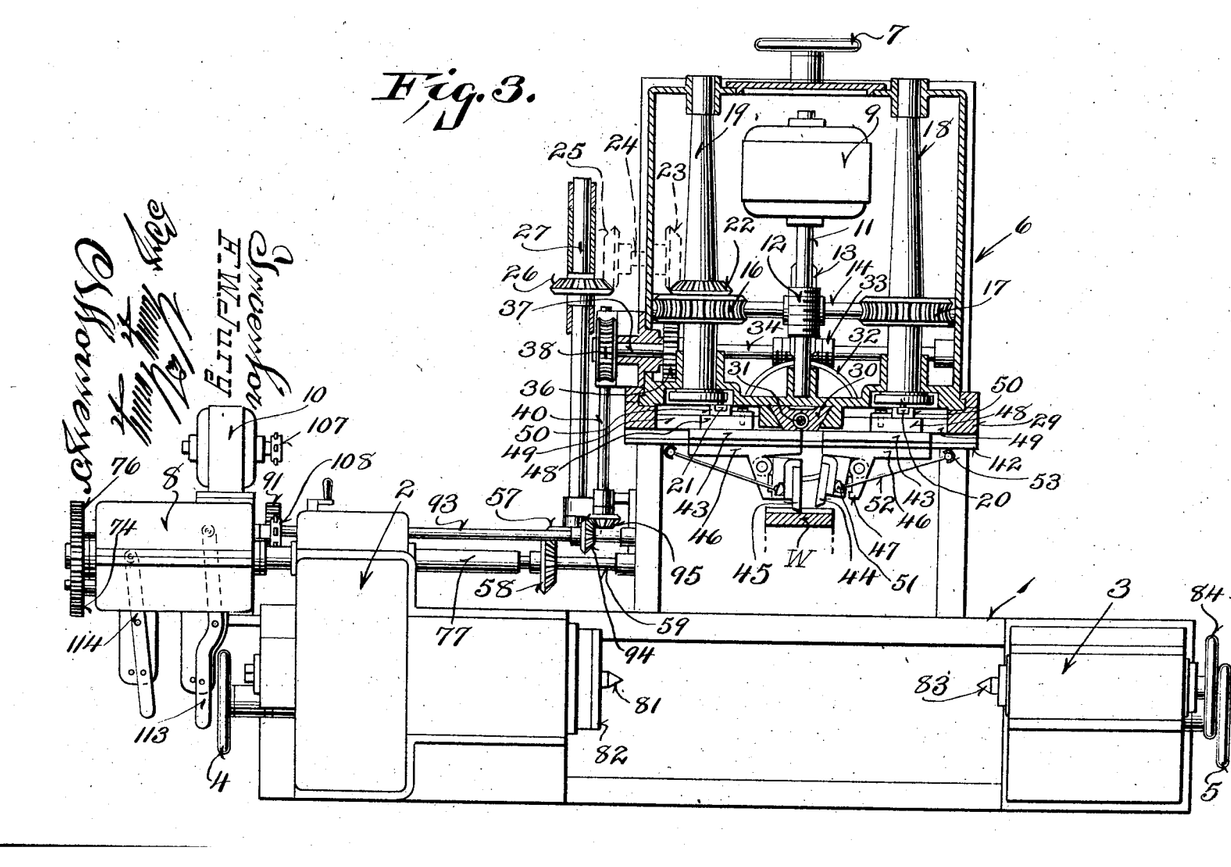
Figure 3 is a plan view of the machine with the cutter head in section.

The entire machine is normally driven from a main motor 9 carried in the cutter head 6, as shown in Figure 3, and motion is transmitted from the mechanism in this head to the gear train in the gear box 8, and from thence to the main or drive head 2. However, it is sometimes desirable to quickly rotate the work or to quickly move the cutters. This is accomplished by means of an auxiliary motor 10 which normally is not in operation, but which may be through the medium of shift gears, hereinafter described, thrown into operation to perform the two functions mentioned above.

With this brief outline of the general operation of the machine, the details of construction will be given.

The cutter head and associated mechanism will first be described.

Referring to Figure 3, it will be seen that the main motor shaft 11 carries a worm 12 which meshes with a worm wheel 13, rigidly carried by a transverse jack shaft 14. This construction is also diagrammatically indicated in Figure 4. This transverse jack shaft carries a pair of worms 15 at opposite ends. These worms drive wheels 16 and 17 carried by crank shafts 19 and 18, and rotate the crank shafts in the same direction. These crank shafts, as will be seen from Figure 3, are journaled in the front and rear portions of the cutter head 6 and are provided with discs equipped with crank pins 20 and 21. One of the crank shafts, 19 for instance, is provided with a bevel gear 22 which meshes with a bevel gear 23 carried by a diagonally and outwardly extending shaft 24, as may be seen from Figures 3 and 4. The lower end of this slanting shaft 24 carries a bevel gear 25 which meshes with a bevel gear 26 slidably splined to a forwardly extending shaft 27. This forwardly extending shaft transmits motion to the train of gears in the gear box 8 by means hereinafter described. It is to be noted that the gears 25 and 26 and the corresponding portions of their shafts are mounted within a bracket 28 rigidly bolted to the cutter head 6 so that this bracket moves forwardly or rearwardly with the cutter head.

The cutter head 6 carries a sliding front plate 29 (see Figures 1, 2, 3, and 12). This sliding plate is carried by suitable guides or ways formed on the cutter head, as shown in Figure 3, and these guides and ways are formed adjacent the ends of the sliding plate. In addition to these guides central guides are provided for carrying the central dove tailed inwardly projecting rib 30. This rib most clearly shown in Figure 3. The rib is apertured and internally threaded and receives the vertical feed screw 31 by means of which the sliding plate 29 is raised or lowered.

Figure 4:
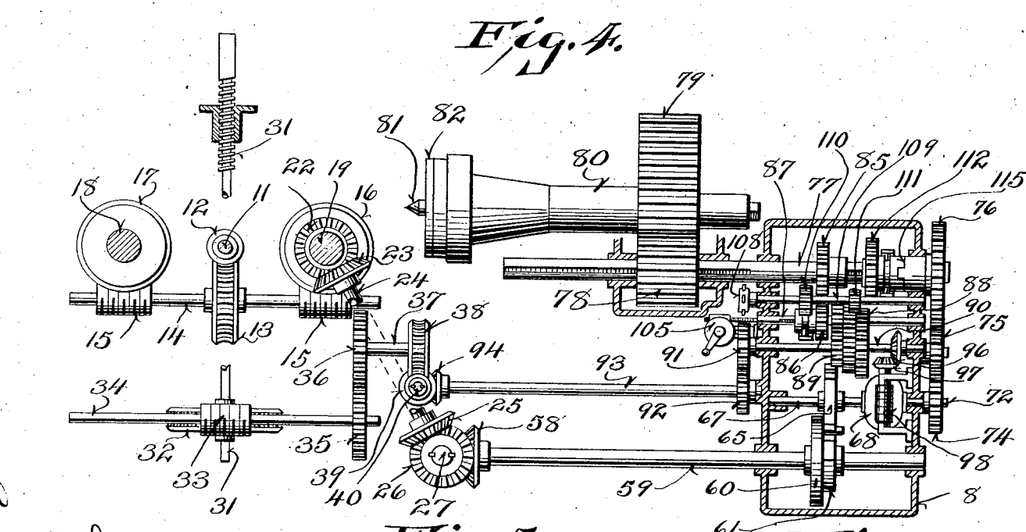
Figure 4 is a diagrammatic view of the gearing.

This feed screw is carried in upper and lower bearings, and is provided with a worm wheel 32 rigid thereon, see Figure 4. This worm wheel is driven by means of a worm 33 rigidly carried by a transverse shaft 34. The outer end of the shaft 34 is connected by means of gears 35 and 36 to a short shaft 37, which projects outwardly through the cutter head 6. This shaft 37, as most clearly shown in Figure 4, carries a worm wheel 38 at its outer end. This worm wheel 38, as may be seen from Figures 1 and 4, meshes with a worm 39 carried by means of a bracket 40' bolted to the cutter head. The worm 39 is slidably splined to the forwardly extending shaft 40, so that when such shaft is driven by means hereinafter described feeding motion is imparted to the vertical plate 29 through the medium of the intermediate gear and the feed screw 31.

The vertical plate 29 carries a pair of upper guides 41 and a pair of lower guides 42. Between these guides a pair of slides 43 are positioned. These slides travel in the angular manner caused by the guides and, consequently, define the angular teeth of the blank through the medium of cutters carried thereby. In reality, the cutters 44 and 45 are carried by cutter heads 46 which are fastened to the slides 43. The cutters 44 and 45 have cutting teeth, as indicated in Figures 1, 2, and 3, and have a body portion which is pivotally mounted upon the cutter heads 46. The cutter heads are provided with stops 47 against which the cutters contact when swung backwardly by mechanism hereinafter described. They are stopped in the other direction by their bases contacting with the cutter heads 46.

The slides or cutter heads 46 are rigidly secured to slides or blocks 48 which are guided in angularly arranged slots 49 formed in the vertical plate 29, as indicated in Figures 2 and 3. These guides or blocks 48 carry crank pin guides 50 which extend transversely across the blocks or slides 48, as indicated in Figure 3. These crank pin guides 50 each have a vertical slot formed therein for the reception of the respective crank pins 20 and 21.

The purpose of this construction is to transmit reciprocatory motion to the cutters from the cranks, and it is to be particularly noted that although the plate 29 may move upwardly or downwardly that nevertheless the same reciprocatory motion is imparted to the cutters, irrespective of the position of the vertically slidable plate 29.

It will be seen from the mechanism thus far described, that provision is made for reciprocating the cutters with definitely related timing, and at the same time for raising and lowering the cutter carrying plate 29, without interferring with the reciprocatory motion of the correct timing of the cutting.

Figure 13:
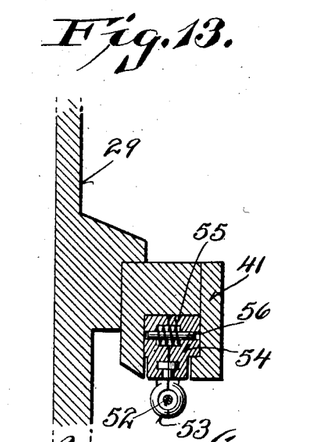
Figure 13 is an enlarged sectional view through one of the friction drag blocks.

In order to draw the cutters out of the work, means are provided for rocking the cutters about their pivot points with respect to their cutter heads. This means is identically the same for each cutter and only one need, therefore, be described. Consider, for example, one of the cutters. The cutter is provided with a ball socket 51 which receives the ball at the inner end of the link 52, such link extending upwardly in a slanting manner, as indicated in Figures 2 and 3. The outer end of the link is also provided with a ball which is received by a ball socket 53. This last ball socket 53 is carried by a split friction block 54, as shown in Figures 13. The friction block consists of two members which are provided with internal recesses, which in turn receive expansion springs 55, such springs tending to urge the parts of the friction block apart. The two members of the friction block are guided by means of pins 56. From Figure 13 it will be noted that the upper guide 41 is in reality an auxiliary guide and overhangs and encloses the friction block 54. Thus the friction block has a friction drag due to the spring pressure, and tends to lag behind the motion of the cutter. Consequently, during the inward or working motion of the cutter, the friction block draws upon the link 52 and swings the cutter into operative or outwardly projection position, as shown for the left hand cutter illustrated in Figure 3. However, upon the outward motion or retracting motion of the cutter, the friction block rocks the links 52 in the opposite direction and, consequently, rocks the cutter into the position shown for the right hand cutter of Figure 3 and thus retracts the cutter and withdraws it from the work.

Thus it will be seen that the cutters swing or move outwardly into working position prior to engagement with the work and execute their working stroke on the return stroke. The cutters are swung inwardly or withdrawn from the work and execute their idle stroke.

Figures 8, 8A:
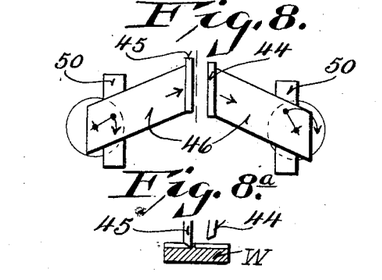
Figures 9, 9A:
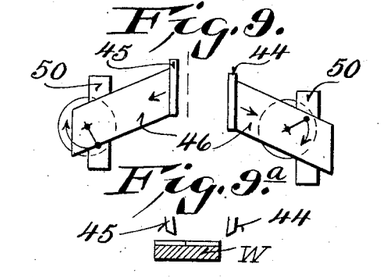
Figures 10, 10A:
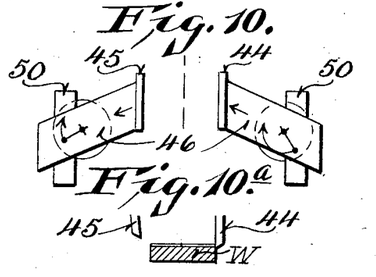
Figures 11, 11A:
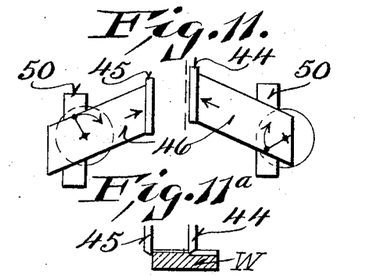
Figure 12:
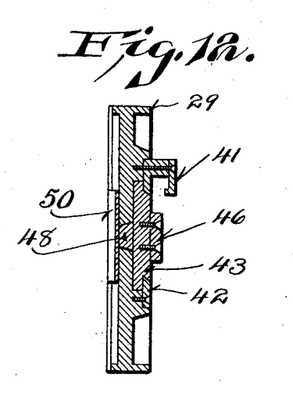
Figure 12 is a sectional view vertically through the cutter slides and cutter blocks.

The cycle of operation of the cutters is indicated in Figures 8 to 11 and 8ᵃ to 11ᵃ. In Figure 8 and Figure 8ᵃ, it will be seen that the cutter 44 is on its idle stroke and is retracted from the work while the cutter 45 is just finishing its working stroke and is in the work. In Figures 9 and 9ᵃ both cutters are executing their idle stroke and are retracted from the work. In Figures 10 and 10ᵃ the cutter 44 is just beginning its working stroke and the cutter 45 is just finishing its idle stroke. At the instant when both cutters are clear of the work which would correspond to a position between the positions indicated in Figure 9 and Figure 10. The work is indexed or turned one or more teeth depending upon the setting of the gear train hereinafter described. Figures 11 and 11ª show the cutter 44 just finishing its working stroke and the cutter 45 just beginning its working stroke.

It will be seen, therefore, that the strokes of the cutters are so timed that they are out of each other's way, and also are clear of the work for approximately a quarter revolution of the crank shafts.

It is, of course to be understood that the length of stroke of the cranks is such as to afford ample clearance of the cutters with respect to the work and, obviously, any of the well-known means may be employed for adjusting the cranks, if desired.

It is to be noted from reference to Figure 1 that the cutters feed upwardly, while the work rotates in the direction indicated by the arrow. Further, it will be seen from this figure that the cutters are tapered and their teeth increase in length towards the lower end of the cutters.

The angle of the cutter teeth, and the angle of the guides 41 and 42 for the cutters, is identical with the angle of the teeth in the finished gear. Further, it will be noted from the mechanism hereinafter described, that the work is held stationary during the cutting operation and, as previously described, is indexed during the time that the cutters are both out of the work.

Figure 6:
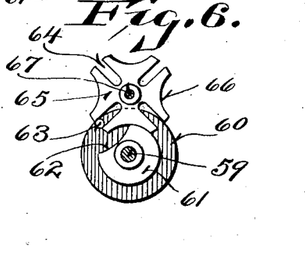
Figure 6 is a detail of a portion of the gearing showing the Geneva wheel.

The means for transmitting motion to the work will now be described. The driving shaft 27 which is driven from one of the crank shafts, as previously described, is provided with a gear 57 at its forward end, and this gear meshes with a gear 58 carried by a longitudinally extending shaft 59. The shaft 59, therefore rotates continuously and extends into the gear box 8, as most clearly shown in Figures 3 and 4. The shaft 59 carries one portion of the Geneva wheel, as shown in Figures 4 and 6, and such portion consists of a disc 60 provided with a central hub 61 cut out upon the arc of a circle, as indicated at 62. The disc also carries a pin 63 which moves into the slots 64 of a star wheel 65, such star wheel being provided with cut outs formed on the arcs of circles, and indicated at 66. The star wheel is mounted upon the short jack shaft 67 and, consequently, a quarter turn is given to this shaft for each revolution of the shaft 59. Further, this motion is very quick and takes place through a small fraction of a turn of the shaft 59. However, due to the interlocking engagement of the hub 61 and the cut out 66, as indicated in Figure 6, it is apparent that no overrunning can occur, and the shaft 67 is accordingly positively turned a quarter turn and then held locked in position.

Figure 5:
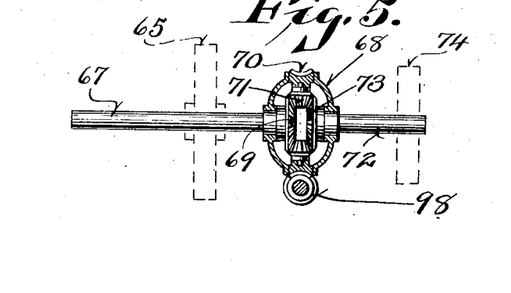
Figure 5 is a detail of the differential forming a portion of the gearing.

The shaft 67 extends to the differential 68 and is rigidly secured to the bevel gear 69. The differential consists of the body portion which carries the worm wheel 70, and also carries the small bevel pinions 71. The other side of the differential is provided with a shaft 72 which carries a bevel gear 73, the pinion 71 being interposed between the gears 69 and 73, as most clearly brought out in Figure 5.

The shaft 72 projects outwardly through the end of the gear box, as shown in Figures 1 and 4, and carries one of the change gears, such as indicated at 74, the change gears being located on the outer side of the gear box 8. The gear 74 meshes with an idler gear 75 which, in turn, meshes with a gear 76, such latter gear being mounted in a manner hereinafter described on a shaft 77 which projects completely through the gear box 8, as shown most clearly in Figure 4. The shaft 77 is splined and slidably carries the driving pinion 78 which meshes with the gear 79, carried by the work driving shaft 80. This work driving shaft 80 is mounted within the main head 2 and carries a center point 81 and a face plate 82 by means of which the work may be centered and rigidly attached to the driving shaft 80.

It is, of course, to be understood that the tail stock 3 is provided with a center point 83 and with the usual hand wheel 84 for advancing or retracting this center point.

Means are provided for feeding the plate 29 upwardly by means of the screw 31. This means has been previously partially described and the description thereof will now be completed. The shaft 77 carries a gear 85 which normally meshes with a gear 86 slidably splined to a transverse shaft 87 carried within the gear box 8, as is apparent from Figure 4. Thus the shaft 87 is driven from the shaft 77 in the normal operation of the machine. This shaft 87 carries a series of cone gears 88 which may be selectively coupled thereto. These cone gears mesh with cone gears 89 rigidly mounted upon a transverse shaft 90. The shaft 90 projects through the gear box 8 and carries a gear 91 which meshes with a gear 92 carried by the longitudinally extending shaft 93. The shaft 93 is coupled to the shaft 40 by means of the bevel gears 94 and 95, as most clearly brought out in Figure 3. From this point the mechanism has been described and it will be seen that as the shaft 93 is rotated, feeding motion is transmitted to the plate 29.

The shaft 90 is provided with a bevel gear 96 which meshes with a bevel gear 97 carried by the shaft of the worm 98, as shown in Figure 4. The worm 98 meshes with the worm wheel 70 of the differential, and thus its motion is compounded with that furnished with the shaft 67, previously described.

In this connection it is to be noted that the amount of feed of the plate 29 with reference to the rotation of the shaft 77 and, consequently, with reference to the shaft 80 is controlled by means of the change gears 91 and 92, which are mounted on the outer side of the gear box 8. The gears 91 and 92 thus control the pitch or spacing of the teeth cut in the blank, while the gears 74, 75 and 76, also mounted on the outer side of the gear box 8, determine the number of teeth which are to be cut in the blank.

By means of the differential, the shifting motion of the cutters in their upward travel is compensated or combined with the motion normally imparted to the work, so that the work and the cutters will at all times be in exact register.

It is to be particularly noted that the screw 31 is permanently tied to the shaft 90 after the selection of the gears 91 and 92 has been made, so that any motion of the worm is at all times combined with the motion of the work to secure the proper registry of the cutters and the teeth formed on the blank.

Figure 7:
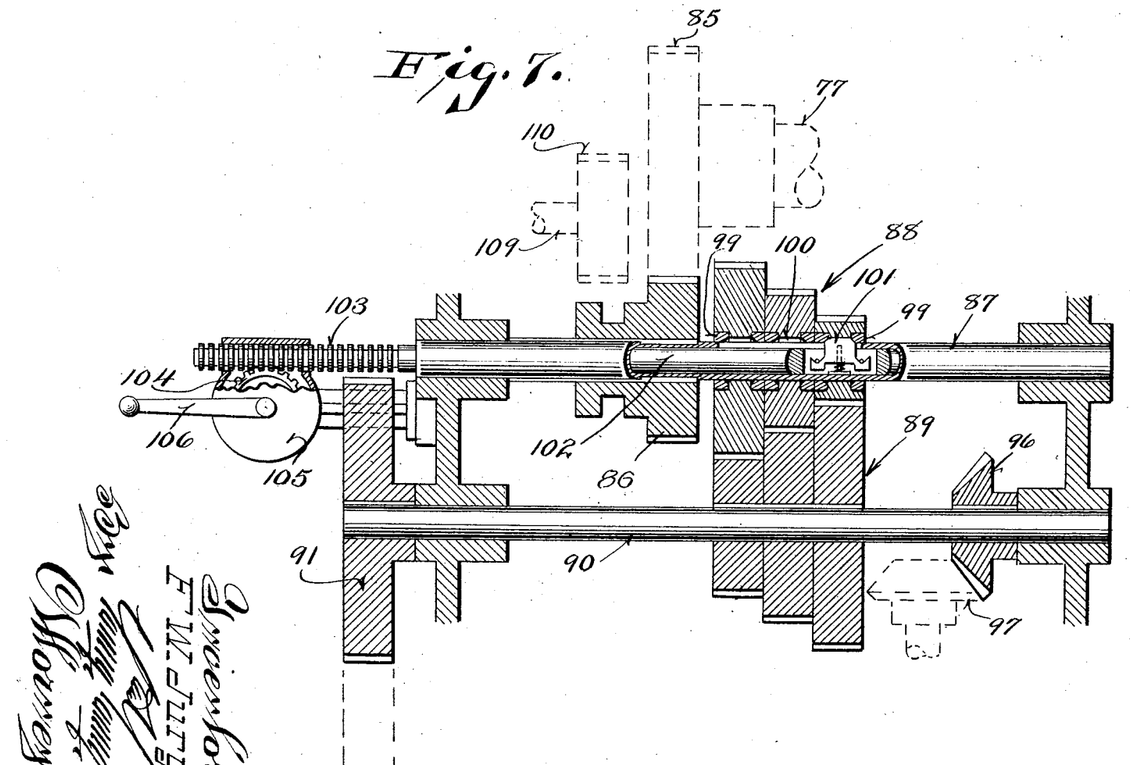
Figure 7 is a detail in section showing the cone change gears and associated parts.

Means are provided, however, for varying the rate of feed of the cutter, although, as described above, any feeding motion of the cutters is at all times combined with the motion of the work. This means for varying the rate of feed for the cutters is controlled by means of the selective cone gears 88 which mesh with the fixed gears 89. The construction of these gears is more clearly shown in Figure 7 which is a sectional view through these gears, and which diagrammatically shows other of the related gears.

Each of the gears 88 is carried by bearing rings 99 rigidly mounted upon the shaft 87. The gears 88 are each provided with a key slot, as indicated at 100 in Figure 7, and a spring pressed key 101 is adapted to snap into any one of the key slots. This spring pressed key 101 is carried by a rod 102 slidably mounted within the shaft 87, and such rod is provided with a transverse slot for the reception of the key 101 and the spring and mechanism associated therewith. It is to be noted that each of the rings 99 is beveled on its inner face, and that the edges of the key 101 are similarly beveled. Thus, as the rod 102 is moved with reference to the shaft 87, the key will be depressed by the rings 99 and detached from the gears 88. However, when the key rides from beneath the rings 99, it will again snap into the selected key slot 100.

Any suitable means may be provided for shifting the rod 102. For example the rod may be provided with a plurality of annular ribs 103 at its projecting end which mesh with the teeth of a spur gear 104 carried within a suitable housing 105, and operated by a manipulating crank 106. It is to be noted that the rod 102 rotates with the shaft 87 as the key 101 passes through a slot in the shaft 87, and necessarily rotates the rod with such shaft.

It is sometimes desirable to quickly drive the screw 31 and, consequently, quickly raise the vertical slide plate 29 with the cutters. This is readily accomplished by providing the auxiliary motor 10 and connecting its sprocket wheel 107 to the sprocket wheel 108 of an auxiliary or jack shaft 109, as shown in Figures 3 and 4. This jack shaft carries a pair of stationary gears 110 and 111. Normally, these gears are out of mesh with other gears in the gear box 8. The gear 86, previously described, carried by the shaft 87 is slidably splined to such shaft and is adapted to be moved out of engagement with its driving gear 85, and to be placed in engagement with the gear 110. This connects the auxiliary motor operatively with the elevating screw 31 and, consequently, permits the rapid elevation or lowering of the cutters. However, the cutters and work do not get out of step, as the shaft 90, which forms a portion of the motion transmitting mechanism of the screw, is permanently coupled with the shaft 80 through the differential and through the gear train on the outer side of the gear box. Consequently, the work and cutters are at all times maintained in correct relative position.

It is also sometimes desirable to quickly rotate the work. This is also easily accomplished by providing a sliding gear 112 splined to the shaft 77, as shown in Figure 4. This sliding gear may be moved into engagement with the pinion 111 and, consequently, the auxiliary motor may quickly rotate the work. The gears 86 and 112 are operated by forked levers indicated in Figure 4 and these levers extend outwardly through the gear box 8, as indicated at 113 and 114 respectively in Figure 1.

The operation of the apparatus is as follows:

The motor 9 drives the crank shafts 18 and 19 and reciprocates the cutters. Motion is transmitted from these shafts to the shaft 59 which enters the gear box and drives the disc 60 of the Geneva wheel. This transmits intermittent motion to the shaft 67 which operates through the differential 68 and operates the gear trains 74, 75, and 76 on the side of the gear box. From this point, motion of the shaft 78 is transmitted to the driving shaft 80 for the work. The screw 31 is driven from the gear 85, (see Figure 4) which transmits motion to the gear 86 and rotates the shaft 87. This shaft is coupled to the shaft 90 by means of the selective cone gears 88 and 89, (see Figures 4 and 7) and, consequently, drives the shaft 90 at the selected speed. This shaft 90 is coupled to the shaft 93 by means of the gears 91 and 92 on the outer side of the gear box, as shown in Figure 4. The shaft 93 through the gear train, previously described, drives the screw 31 and, consequently, elevates the cutters while they continuously reciprocate. The motion of the screw 31 is compounded with that of the work through the medium of the differential 68, which is operatively coupled not only to the shaft 67, but also the shaft 90, as is apparent from Figure 4.

It is to be understood that the change gear trains 74, 75 and 76 determine the number of teeth which will be cut on the blank as it determines the indexing of the wheel.

It is also to be noted that the gears 91 and 92, which are change gears, determine the pitch of the teeth as they determine the relative position of the cutters and work.

Each of these change gears is accessible from the outer side of the gear box and, consequently, it is a simple matter to select the appropriate combination of gears for the desired number of teeth and also for the pitch.

It will be seen that the work is fed, as indicated in Figure 1, and the cutters fed upwardly, as indicated in such figure. Consequently, there is no back lash and no lost motion which would interfere with the accuracy of the work. Further, it is to be noted that while the work "W" rotates a number of times the cutters travel upwardly their full length and when they have traveled their full length upwardly, all of the teeth are completely finished around the work.

It is to be noted further that the sliding gear 86 may be moved out of mesh with either the gear 85 or the gear 110 and, consequently, can occupy a neutral or intermediate position. Under these conditions, it is possible to rapidly rotate the work independently of the feeding of the cutters. This rapid rotation of the work is accomplished by moving the gear 112 into engagement with the gear 111. When this is done, the clutch 115 is open and, consequently, the gear 76 is disconnected from the shaft 77. This rapid rotation of the work is frequently desirable for trimming up the gear, after it has been completely formed and without taking it from the mandrel.

This machine can be expediently used not only for the formation of large double helical gears, but may also be efficiently used for the formation of small gears, which necessarily must be sold rather cheaply.

The above results are possible due to the construction of the machine which permits its rapid operation and thus secures a very economical mode of operation with a minimum loss of time.

It is to be noted further that the machine, although accomplishing the results enumerated above and forming double helical gears of the utmost accuracy, is nevertheless relatively simple and extremely sturdy in construction.

Although the invention has been described in considerable detail, such description is intended as illustrative rather than limiting as the invention may be variously embodied and as the scope of such invention is to be determined as claimed.

I claim:

1. A gear cutting machine for cutting double helical gears, comprising a pair of crank shafts having cranks thereon, means for rotating said shafts, a pair of angularly set guides, a pair of cutter carrying members directly operated from said cranks, cutters carried by said members, means for supporting and rotating a blank adjacent said cutter, gearing transmitting motion to said blank rotating means, and intermittent motion mechanism interposed between said gearing and said blank rotating means for intermittently rotating said blank in one direction only, whereby said blank is rotated in a step by step manner as said cutters oscillate and rotates in the same direction throughout the entire operation of the machine in producing a complete gear, said cutters executing only a single cut on each successive tooth completely around the blank until the entire gear is formed.

2. A double helical gear cutting machine, comprising a cutter head having a pair of crank shafts arranged therein, a pair of guides carried on the front of said cutter head, cutter carrying members guided within said guide, cutters carried by said members, said cutter carrying members having vertically slotted projecting portions directly engaged by said cranks for transmitting motion to said cutter carrying members while permitting feeding motion of said cutters transversely to said cranks, means for feeding said cutters transversely to said cranks, and means for holding and rotating work adjacent said cutters.

3. In a machine for cutting double helical gears, the combination of a cutter head having a pair of divergent guides, a pair of cutter carrying members guided by said guides, cutters carried thereby, means for moving said cutters in and out as said cutter carrying members are reciprocated, independent means for reciprocating said cutter carrying members, means for holding work and rotating such work adjacent said cutters, a gear train operatively connecting said cutters to each other and to said work holding means, intermittent motion locking mechanism interposed in said gear train for causing a step by step indexing of said work holding means, means for feeding said cutters transversely to their reciprocatory paths, and means for combining the feeding motion of said cutters with the motion imparted to said work holding means.

4. A machine for cutting gears, comprising a cutter head, a slidable plate carried by said cutter head and having angular guides thereon, a cutter carrying member guided by said guides, a crank operatively connected with said cutter carrying member, means for moving said slidable plate with reference to said cutter head, work holding means for holding and indexing the work adjacent said cutter, a gear train connecting said crank and said work holding means, means for combining the motion of said plate with the motion transmitted to said work holding means, a main drive for driving said crank and work holding means and said plate, and an auxiliary drive for selectively driving either said work holding means or said plate.

5. A gear cutting machine, comprising a cutter adapted to reciprocate, means for driving said cutter, means for feeding said cutter transversely of the direction of reciprocation, a main drive for the cutter reciprocating means, means for holding and indexing the work adjacent said cutter and connected with said main drive by means of gearing, mechanism combining the motion transmitted to said work holding means with the feeding motion of said cutters, and an auxiliary drive adapted for connection with said gearing and adapted to simultaneously shift the cutters transversely of their direction of reciprocation, and for correspondingly moving the work to insure correct registry of the cutters and said work.

6. A gear cutting machine adapted to cut double helical gears comprising a pair of crank shafts, a pair of cutters guided in angularly set guides and operated from said crank shafts, said crank shafts being set approximately 90° apart, a feeding means for advancing the guides, a work carrying spindle, means operatively connected to said crank shaft for advancing said spindle in a step by step manner when the cutters are out of the work to index the work, and means for modifying the indexing of the work in accordance with the advance of the cutter guides.

7. A machine for cutting double helical gears comprising a pair of independent angularly guided cutters, means for reciprocating said cutters independently of each other, a work carrying member, means for advancing said work carrying member in a step by step manner when the cutters are out of the work, means for gradually advancing the cutter guides, and means for combining the advancing motion of the cutter guides with the indexing motion of the work whereby the proper relation of work and cutters is maintained at all times to secure proper generation of the teeth.

8. In a gear cutting machine the combination of a cutter head having a slidably mounted plate provided with guides, a cutter carrier mounted within said guides, a cutter carried by said cutter carrier, means carried within said head for imparting reciprocatory motion to said cutter carrier, work carrying members, one of said members being adapted to drive said work and index such work, a gear train operatively coupling said cutter reciprocating member and said work indexing means, said gear train having a train of interchangeable gears for determining the number of teeth to be cut on the work and having a second set of interchangeable gears for determining the pitch of such teeth.

9. In a gear cutting machine the combination of a cutter head having a slidably mounted plate provided with guides, a cutter carrier mounted within said guides, a cutter carried by said cutter carrier, means carried within said head for imparting reciprocatory motion to said cutter carrier, work carrying members, one of such members being adapted to drive said work and index such work, a gear train operatively coupling said cutter reciprocating member and said work indexing means, said gear train having a train of interchangeable gears for determining the number of teeth to be cut on the work and having a second set of interchangeable gears for determining the pitch of such teeth, and means for compounding the sliding motion of said plate with the motion transmitted to said work indexing means, whereby the cutter and the work will register at all times irrespective of the advance of said sliding plate.

10. A gear cutting machine for cutting double helical gears comprising work carrying means adapted to drive and index said work, a gear train for operating said work driving means and comprising intermittent motion mechanism for indexing the work, a pair of reciprocatory cutters, a pair of cranks for driving said cutters, gearing connecting said cranks and said gear train for imparting motion to said gear train, a sliding plate carrying said cutters, means for advancing said plate, gearing for compounding the advancing motion of said plate with the indexing motion of said gear train, said gear train having one set of gears determining the number of teeth cut in the work and having a second set of gears determining the pitch of such teeth.

11. A gear cutting machine for cutting double helical gears comprising work carrying means adapted to drive and index said work, a gear train for operating said work driving means and comprising intermittent motion mechanism for indexing the work, a pair of reciprocatory cutters, a pair of cranks for driving said cutters, gearing connecting said cranks and said gear train for imparting motion to said gear train, a sliding plate carrying said cutters, means for advancing said plate, gearing for compounding the advancing motion of said plate with the indexing motion of said gear train, said gear train having one set of gears determining the number of teeth cut in the work and having a second set of gears determining the pitch of such teeth, and means for varying the rate of feed of said plate independently of the setting of the pitch and the number of teeth.

In testimony that I claim the foregoing I have hereunto set my hand at Milwaukee, in the county of Milwaukee and State of Wisconsin.

FRANK W. JURY.